United States Patent [19]

Stephany et al.

[11] Patent Number: 5,519,419
[45] Date of Patent: May 21, 1996

[54] CALIBRATION SYSTEM FOR A THERMAL INK-JET PRINTER

[75] Inventors: Joseph F. Stephany, Williamson; Gary A. Kneezel, Webster; Richard V. LaDonna, Fairport; Thomas E. Watrobski, Penfield; Joseph J. Wysocki, Webster; James Eaton, Walworth, all of N.Y.

[73] Assignee: Xerox Corporation, Stamford, Conn.

[21] Appl. No.: 198,756

[22] Filed: Feb. 18, 1994

[51] Int. Cl.⁶ ................................. B41J 29/393
[52] U.S. Cl. ............................................ 347/19
[58] Field of Search ......................... 347/14, 19, 17, 347/188, 183, 189, 57; 358/406, 504

[56] References Cited

U.S. PATENT DOCUMENTS

| | | | |
|---|---|---|---|
| 5,038,208 | 8/1991 | Ichikawa et al. | 347/19 X |
| 5,066,961 | 11/1991 | Yamashita | 346/76 |
| 5,189,521 | 2/1993 | Ohtsubo et al. | 358/296 |
| 5,223,853 | 6/1993 | Wysocki et al. | 347/14 |
| 5,387,976 | 2/1995 | Lesniak | 356/379 |

Primary Examiner—Joseph W. Hartary
Assistant Examiner—Craig A. Hallacher
Attorney, Agent, or Firm—R. Hutter

[57] ABSTRACT

A thermal ink-jet printhead adapted to emit ink onto a print sheet is automatically adjusted. The printhead is caused to emit ink onto a sheet in a manner consistent with an image of a first density, and then substantially immediately caused to emit ink in the form of a first test pattern on the sheet. The density of the first test pattern on the sheet is measured. The printhead is caused to emit ink onto the sheet in a manner consistent with an image of a second density, and then substantially immediately caused to emit ink in the form of a second test pattern on the sheet. The density of the second test pattern on the sheet is measured. The densities of the first test pattern and the second test pattern are correlated with a function relating a characteristic of an image printed with the printhead to a temperature of the printhead.

8 Claims, 4 Drawing Sheets

CALIBRATION SYSTEM FOR A THERMAL INK-JET PRINTER

This Application incorporates by reference U.S. Pat. No. 5,223,853, assigned to the assignee hereof.

FIELD OF THE INVENTION

The present invention relates to a spot-size control system for a thermal ink jet printhead.

BACKGROUND OF THE INVENTION

In thermal ink jet printing, droplets of ink are selectively emitted from a plurality of drop ejectors in a printhead, in accordance with digital instructions, to create a desired image on a surface. The printhead typically comprises a linear array of ejectors for conveying the ink to the sheet. The printhead may move back and forth relative to a surface, for example to print characters, or the linear array may extend across the entire width of a sheet (e.g. a sheet of plain paper) moving relative to the printhead. The ejectors typically comprise capillary channels, or other ink passageways, forming nozzles which are connected to one or more common ink supply manifolds. Ink from the manifold is retained within each channel until, in response to an appropriate digital signal, the ink in the channel is rapidly heated and vaporized by a heating element disposed within the channel. This rapid vaporization of the ink creates a bubble which causes a quantity of ink to be ejected through the nozzle to the sheet.

U.S. Pat. No. 5,223,853, entitled "Electronic Spot Size Control in a Thermal Ink Jet Printer," discloses a system by which ink jet droplets of a consistent size may be ejected from a thermal ink jet printhead, regardless of the original temperature of the liquid ink in the printhead. As described in detail in that patent, one of the most crucial parameters for image quality in an ink jet printer is the spot size of individual droplets of ink emitted from the printhead, and in turn the most crucial parameter for determining the spot size of individual droplets is the temperature of the liquid ink immediately before ejection. The system of U.S. Pat. No. 5,223,853 operates on the principle of first measuring the temperature of the liquid ink in the printhead and then, in response to this measured temperature, providing to the printhead an optimal combination of power (typically voltage) and pulse duration to a heating element to vaporize the liquid ink and cause it to be ejected from the printhead. From the standpoints of preventing overheating of the printhead chip, avoiding kogation of ink within the printhead, and other practical concerns, a selected pulse duration must be coupled with an appropriate power level, and vice-versa. For each measured temperature there is provided in this system a best combination of power and pulse width, as opposed to a system which merely increases or decreases one input or the other.

Although the temperature of the liquid ink has a demonstrable relationship with the size of an individual droplet of ink on the print sheet, and therefore of the general print quality, several other specific conditions will have a noticeable effect as well. Foremost among these is the particular character of the print sheet itself: for example, different types of paper may have substantially different types of absorbency or gloss, which will directly affect the character of images printed thereon, and these particular qualities of the sheet will in turn vary somewhat with ambient conditions, particularly humidity. In general, a more absorbent type of paper, such as newsprint, is very good at holding ink ejected thereon— although, at the same time, particularly absorbent types of paper may induce "wicking" of ink along the fibers thereof, causing a blurry image. At the other extreme, a coated transparency has very small absorbency. Because any absorbent member, such as a piece of paper, has a finite ability to hold liquid, a sheet which is already somewhat damp from the ambient humidity will be less able to hold ink from the printing process. There may indeed be even more variables affecting the spot size and print quality, some of which may be imperfectly understood. Still, the only major parameter affecting print quality which is likely to change in the course of printing is the temperature of the liquid ink: the action of the heating elements within a printhead causes a substantial increase in temperature of the printhead in the course of printing a job.

In the prior art, U.S. Pat. No. 5,189,521 discloses a control system useful for balancing the densities of a plurality of different-colored ink-jet heads. The system includes the steps of creating a test pattern with the plurality of ink-jet heads, and reading the test pattern to yield a "density distribution" indicative of the condition of the various heads.

U.S. Pat. No. 5,066,961 discloses a thermal (as opposed to init-jet) printer including a system for compensating for heat accumulated while the printer is in use, to yield a constant image density. The system predicts, based on the incoming image data, the temperature of the thermal head after energy is applied to the thermal head, and then the pulse width is adjusted accordingly.

U.S. Pat. No. 5,038,208 discloses an ink-jet copier in which data corresponding to the characteristics of the particular printheads is stored in a memory, and the image-forming signals are modified in view of this data.

SUMMARY OF THE INVENTION

According to the present invention, there is provided a method of controlling a thermal ink-jet printhead adapted to emit ink in imagewise fashion onto a print sheet. The printhead is caused to emit init onto a sheet in a manner consistent with an image of a first density, and then substantially immediately caused to emit ink in the form of a first test pattern on the sheet. The density of the first test pattern on the sheet is measured. The printhead is caused to emit init onto the sheet in a manner consistent with an image of a second density, and then substantially immediately caused to emit init in the form of a second test pattern on the sheet. The density of the second test pattern on the sheet is measured. The densities of the first test pattern and the second test pattern are correlated with a function relating a characteristic of an image printed with the printhead to a temperature of the printhead.

DETAILED DESCRIPTION OF THE INVENTION

Figure 1:
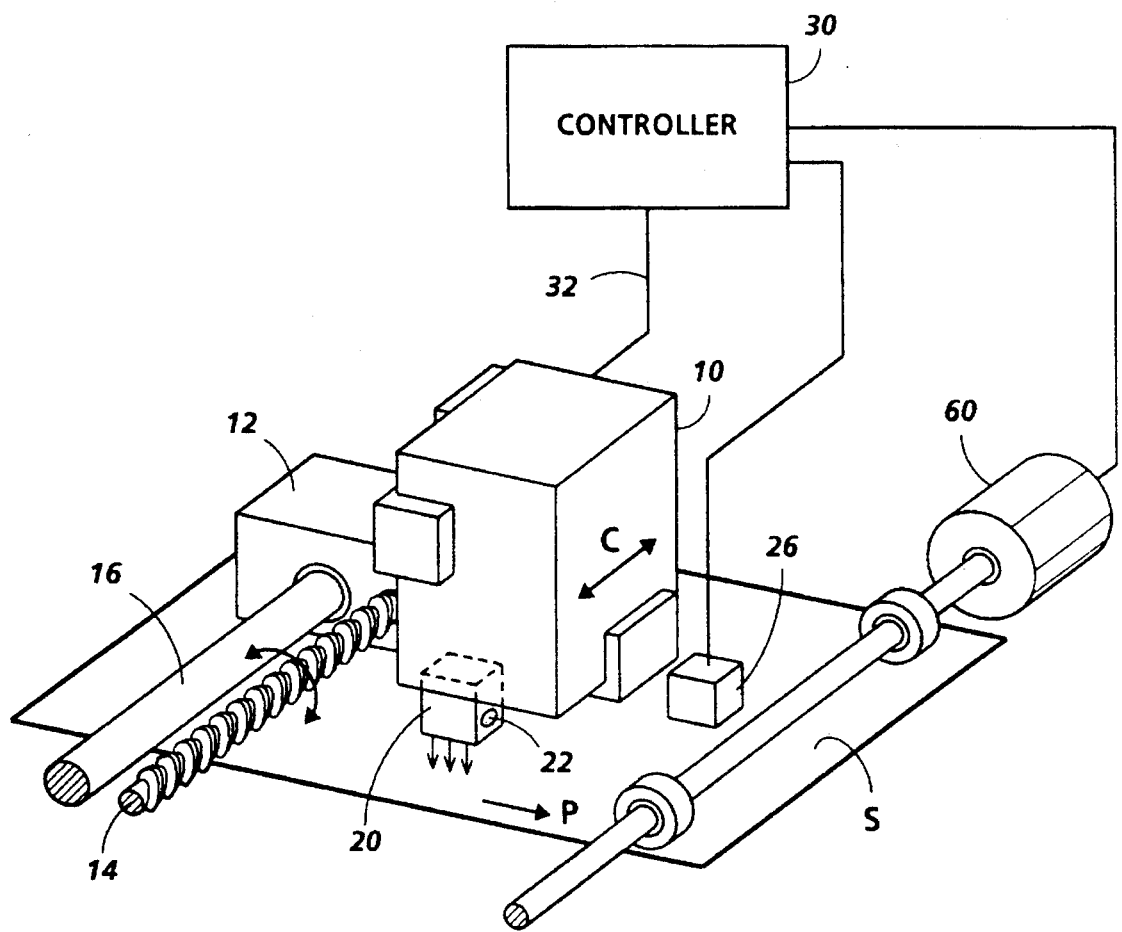
FIG. 1 is a simplified elevational view showing the essential elements of a carriage-type ink-jet printer.

FIG. 1 shows the basic elements of a reciprocating-carriage-type thermal ink-jet printer for creating color or monochrome images on a sheet S. An ink cartridge 10, having a plurality of ink supplies therein, is preferably removably mounted on a carriage 12. This carriage 12 is adapted to move in a back-and-forth manner in direction C across sheet S, which is moving in process direction P. The sheet S is caused to move in direction P by means of a stepper motor or other indexing motor 60, which is preferably adapted to cause the motion of sheet S in direction P in a stepwise fashion, holding the sheet S in a stationary position while the cartridge 10 moves across the sheet in direction C, and then indexing the sheet S in processing direction P between swaths of printing caused by the action of cartridge 10 on carriage 12.

Carriage 12 is provided with one of various possible means for moving the cartridge 10 back and forth across sheet S. As shown in FIG. 1, one such means includes a rotatable lead screw 14 having threads thereon which interact with a structure on the carriage 12 so that, when lead screw 14 is caused to rotate by a motor (not shown), the interaction of the lead screw threads with the structure on carriage 12 will cause the carriage 12 and the cartridge 10 mounted thereon to move in direction C along rod 16 across the sheet S. The lead screw is only one possible means for moving the carriage, and other means, such as a pulley system, may be preferred. Preferably, there should be substantially even back-and-forth motion of the cartridge 10 so that the printing operation can be carried out in both directions.

At the bottom of cartridge 10 is a printhead 20, which is shown directed downward toward the sheet S. Printhead 20 comprises one or more linear arrays of thermal ink-jet ejectors, each ejector being operatively connected to a particular ink supply, depending on the specific embodiment of the present invention. Generally, the linear array of ejectors in printhead 20 extends in a direction parallel to process direction P, so that, when the cartridge 10 is caused to move in carriage direction C, the linear array will "sweep" across the sheet S for an appreciable length, thus creating a print swath. While the carriage is moving across the sheet S, the various ejectors in the linear array are operated to emit controlled quantities of ink in an imagewise fashion, thus creating the desired image on the sheet. Typical resolution of the ink-jet ejectors in printhead 20 may be from 200 spots per inch to 800 spots per inch. According to the present invention, printhead 20 includes thereon, or in close proximity thereto, a thermistor 22 (or other temperature measuring device having electronic output), which is adapted to measure the temperature of the printhead as needed. (As used in the claims herein, the word "printhead" need not apply to an entire printhead, but could apply as well to a portion of a printhead in an apparatus, or to a selected subset of ejectors in the printhead.)

Operatively associated with the printhead 20 is a controller, which is generally shown by a schematic box 30, connected by a bus such as 32 to the printhead 20. The purpose of the controller 30 is to coordinate the "firing" of the various ejectors in the printhead 20 with the motion of cartridge 10 in carriage direction C, and with the process direction P of sheet S, so that a desired image in accordance with the digital data is rendered in ink on the sheet S. Image data in digital form is entered into controller 30, and controller 30 coordinates the position of the printhead 20 relative to a sheet S, to activate the various ejectors as needed, in a manner generally familiar in the art of ink-jet printing. When individual ejectors within printhead 20 are fired, each ejector has applied thereto a firing voltage of a predetermined magnitude and time duration dictated by the controller 30, in a manner which will be described in detail below. An important input to controller 30 is the output of thermistor 22 on printhead 20, in a manner which will be shown in detail below.

Also associated with the controller 30 is a densitometer 26, which is positioned downstream of printhead 20 so that a test patch created by printhead 20 in a predetermined position on a sheet can be monitored for its density, that is, the extent of ink coverage actually on a particular sheet S relative to an intended amount. For example, if a test patch created by printhead 20 in a particular location on the sheet S is intended to be a 50% halftone screen, it is to be expected that the reflectivity of the test patch area will be halfway between that of the bare sheet and a sample area entirely covered with ink. Many types of densitometers are known, and there exist certain types which are able to take into account not only the original reflectivity of the bare sheet, but also the incidental reflectivity, if any, of the ink itself (ink on a sheet, even if it is intended to be black, may have some incidental "sheen" which must be considered). In other words, by properly placing the light source and detector, specular reflection may be avoided. One such densitometer, which is originally intended for use in measuring the density of a toner test patch on a photoreceptor in an electrophotographic printer, is shown in U.S. Pat. No. 5,204,538, although many other types of densitometers are available in the prior art.

When it is desired to test the system under a given set of printing conditions, including the type of paper loaded into the printer, the ambient humidity, and so forth, controller 30 commands the printhead 20 to place a test patch of a predetermined halftone screen in a predetermined location on a test sheet, and then the test sheet is moved so that the test patch is placed under the densitometer for a reading. According to the present invention, this process of providing a test patch on a sheet at the beginning of a print job and then measuring the density of the test patch is specifically designed to yield not only an optimum combination of pulse duration and power to ensure a predetermined spot size, but is also intended to obtain a temperature response that will remain valid for the duration of the print job. By "temperature response" is meant the derivation of a function by which, under a given set of conditions, a relationship between liquid ink temperature and resulting spot size can be known; with this knowledge, a compensatory function can be derived therefrom. By the compensatory function, when the temperature of the printhead increases in the course of printing a job, new optimal combinations of pulse duration and power can be provided as needed according to the changes in temperature and the other conditions, to ensure a consistent spot size.

Figure 2:
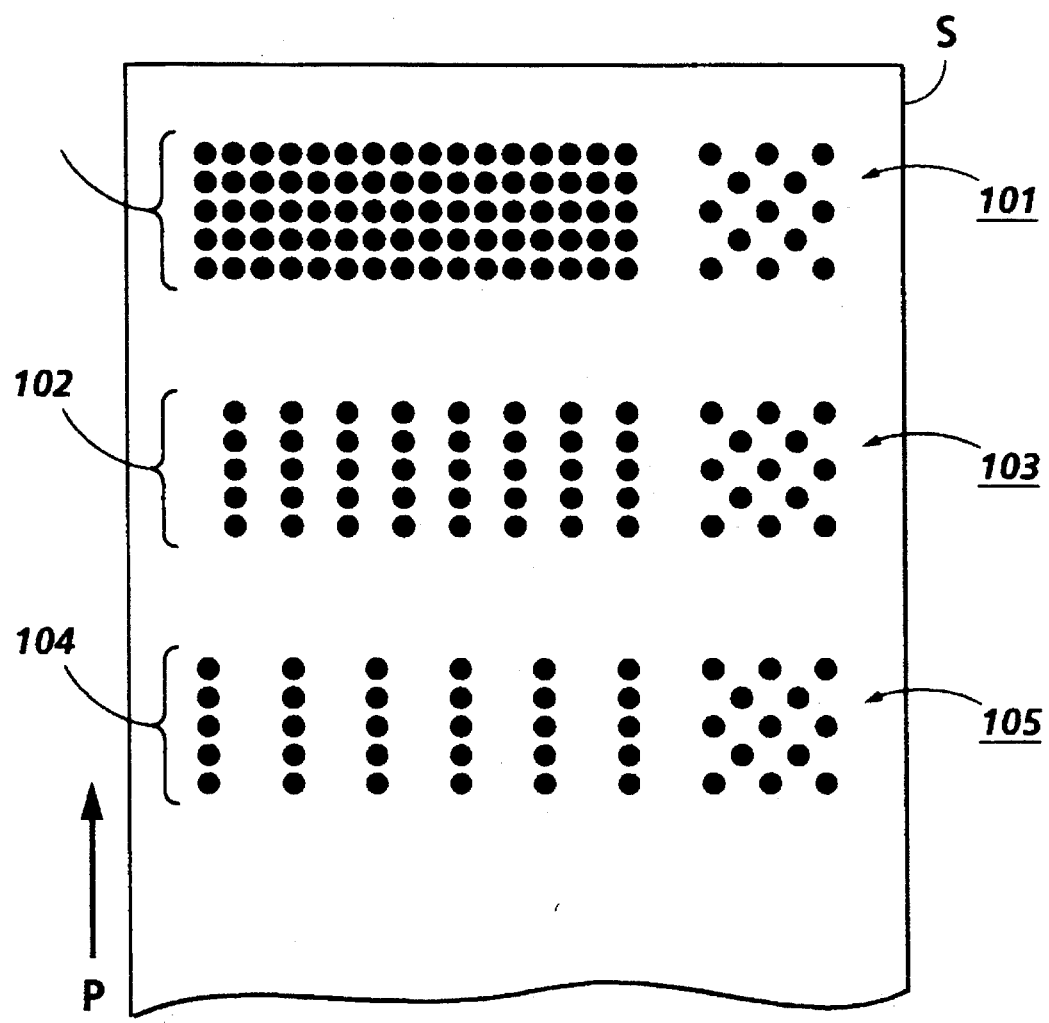
FIG. 2 is a plan view of a sample test pattern printed with an ink-jet printer in order to carry out the method of the present invention.

FIG. 2 is a plan view of a sheet 5 (or a portion thereof) illustrating a method according to the present invention. In FIG. 2, the top portion of the sheet 5 illustrates what was printed according to the present invention first in time, with successive steps following as one goes down the portion of sheet 5 (note, for example, the process direction P). There is first shown at the top of sheet S an area of relatively heavy ink density 100. The relatively high density is shown by the high density of spots in area 100, although for this first step complete ink coverage may be desired. It will be noted that the configuration of this "heating area" 100 is consistent with a partial swath of the printhead 20 through the carriage direction C with all of the ejectors in the printhead firing in every pixel (this is shown in stylized form in FIG. 2). After printing heating area 100 the printhead substantially immediately prints a first test patch shown as 101, which is in the form of a halftone screen of predetermined density; a halftone screen of approximately 50% is useful, but other densities may work as well. In the next line, corresponding to a subsequent swath of the printhead 20 along the carriage direction, there is shown a second heating area 102, which, as can be seen, is of a density slightly less than that of the first heating area 100. Immediately after printing this second heating area, the printhead once again prints a second test patch 103 of the same type of halftone screen as test patch 101. Preferably, the test patch 103 should be aligned with test patch 101 along the process direction P, so that both test patches may be detected by densitometer 26 as the sheet 5 moves through process direction P. A third heating area, shown as 104, is printed in a subsequent swath, with an even lighter density as in the previous heating areas 100 and 102. Finally, a third test patch 105, which is identical to and aligned with test patches 101 and 103, is printed. This sequence of operations has as its purpose the measurement of the spot size versus temperature curve for a fixed burn voltage and pulse width. It may be repeated with different burn voltages and pulse widths in order to generate data relating printing density or spot size to operating conditions, as will be explained in detail below.

The effect of the above steps is to heat the printhead 20 to its maximum likely extent, by printing an extremely dense swath which requires all the ejectors in the printhead to be fired very quickly for a relatively extended period of time, and then to let the printhead cool down in stages. As can be seen in FIG. 2, with the printing of heating area 100, the printhead will get relatively hot by the end of printing out heating area 100, just when the first test patch 101 is printed; this test patch 101 can thus be said to represent the behavior of the printhead under the highest plausible temperature conditions. In the next heating area 102, which may follow the printing area 100 by several swath widths, a slightly less drastic heating of the printhead is carried out by printing the slightly less dense heating area 102, and then the process is repeated for the relatively lighter heating area 104. After the printing of each heating area 100, 102 or 104, the temperature of the printhead, by which is inferred the temperature of the liquid ink therein, is measured by thermistor 22. The resulting data is a set of three data points showing a relationship of the density of the successive test patches compared to the instantaneous temperature of the printhead 20 at each time. These three data points can thus be correlated into a more general function, which will form the temperature response of the printhead itself, under the specific conditions of printing on a particular type of sheet at a particular time.

Figure 3:
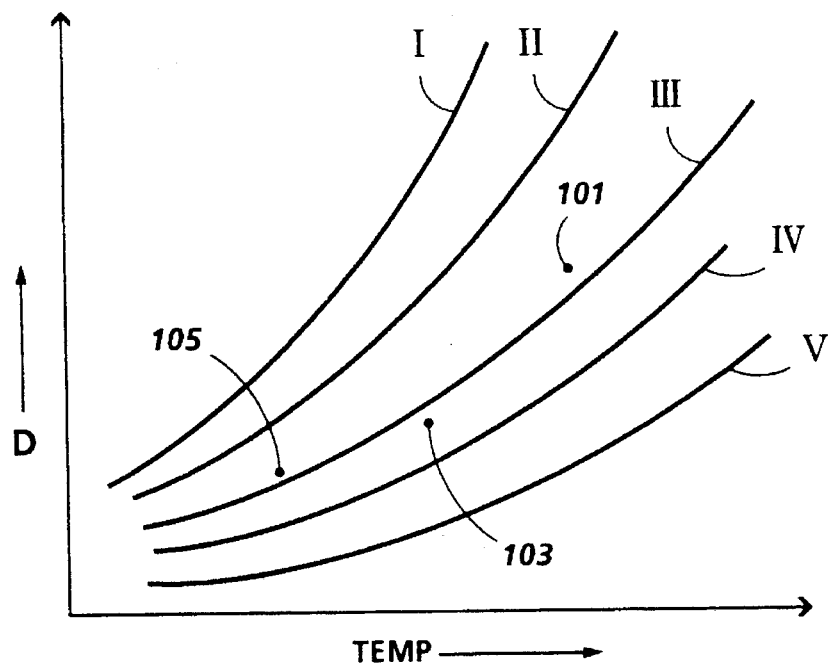
FIG. 3 is a sample graph showing possible relationships between a measured temperature of liquid ink in a printhead, and the measured density of a test patch.

FIG. 3 is a representative set of possible temperature responses, numbered I–V, which may be chosen from in order to carry out the method of the present invention. The five possible temperature responses shown each represent a relationship between a measured temperature of liquid init (the x-axis of the graph) and the measured density of the test patch (the y-axis of the graph), it is generally true, in most instances, that an increase in the temperature of liquid ink will generally result in a larger spot size for each emitted droplet, and therefore a higher density for a halftone screen; however, the slope of this relationship, and even its linearity, will depend on any number of specific conditions, such as the quality of the print sheet and the ambient humidity. In the process of testing, wherein the heating areas and test patches shown in FIG. 2 are carried out, three data points will result, each point representing a combination of a measured temperature and an observed test patch density. These data points, shown in FIG. 3 with numbers indicating their relationship to the test patches in FIG. 2, will be located somewhere on the graph of FIG. 3. The question then becomes, which of a predetermined set of possible relationships gives the best fit for these three test points. In the the illustrated example, it is clear that function III seems to be the best approximation for the behavior of the three spots printed under a given set of conditions.

Although the example functions in FIG. 3 are shown as generally monotonic, there is no reason why a prearranged set of possible temperature responses need to be exclusive of each other; it may be necessary, given experimentation with a given design of a printing apparatus, to have a large number of possible temperature responses which could fit test data, and these various responses may be linear or nonlinear, and may indeed cross each other. In a typical commercial embodiment of the present invention, it is probably most useful to have a set of a given number of possible responses, such as the responses I–V shown in FIG. 3, and simply to determine which of these predetermined functions provides the best fit.

Although in the preferred embodiment of the present invention, measuring of the printhead temperature follows printing of fixed test patterns, it is conceivable to have a system which will "end up" at a known temperature, such as by printing out a heating area for as long as necessary until various predetermined test temperatures of the printhead are reached (e.g. at 30, 40, 50 degrees C.), at which points test patches are printed.

Figure 4:
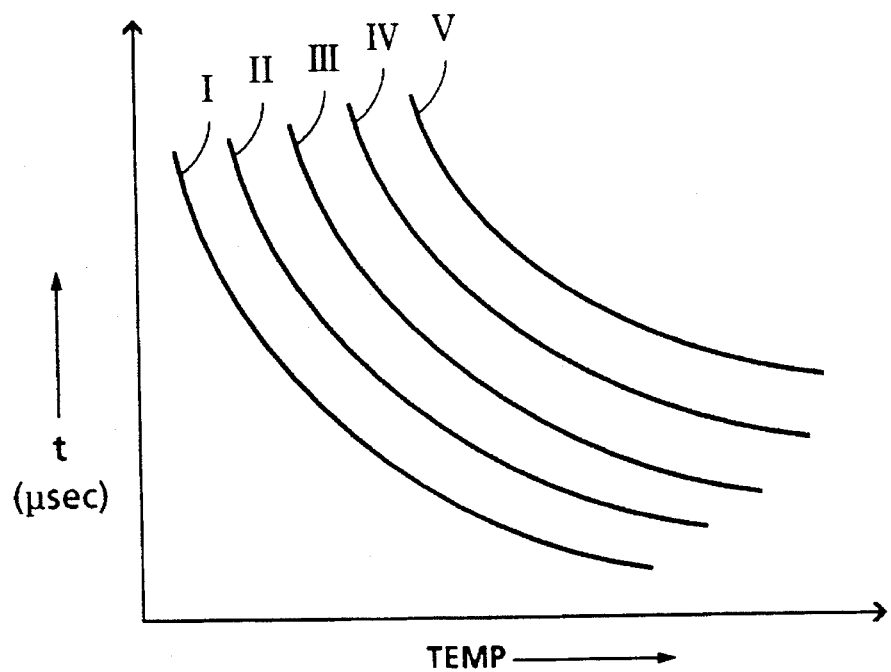
FIG. 4 is a simplified representative graph showing possible relationships between measured temperature of liquid ink in a printhead, and a necessary pulse duration for the printhead to output ink droplets of a desired spot size.

Each possible thermal response between temperature and image density mathematically implies another relationship, between a measured temperature of the liquid ink and the necessary pulse duration to the printhead to obtain a constant spot size. Examples of such functions are shown in FIG. 4. (:An empirical version of this graph, for an actual tested system, can be found in U.S. Pat. No. 5,223,853.) In the preferred method described in the '853 patent, the liquid ink temperature is measured, and in a first step a necessary pulse duration is selected; once the necessary pulse duration is selected, a power or voltage level consistent with the pulse duration is selected. Thus, for each temperature response curve shown in FIG. 3, there will be implied a set of look up values restating a relationship shown in FIG. 4. (The representative lines shown in FIG. 4 are given as examples only, and are by no means meant to necessarily mathematically relate to the curves in FIG. 3 on an empirical basis. Suffice to say that every unique relationship between temperature and density given in FIG. 3 will imply another unique relationship in the graph of FIG. 4 and the resulting associated power levels for each pulse duration.)

Figure 5:
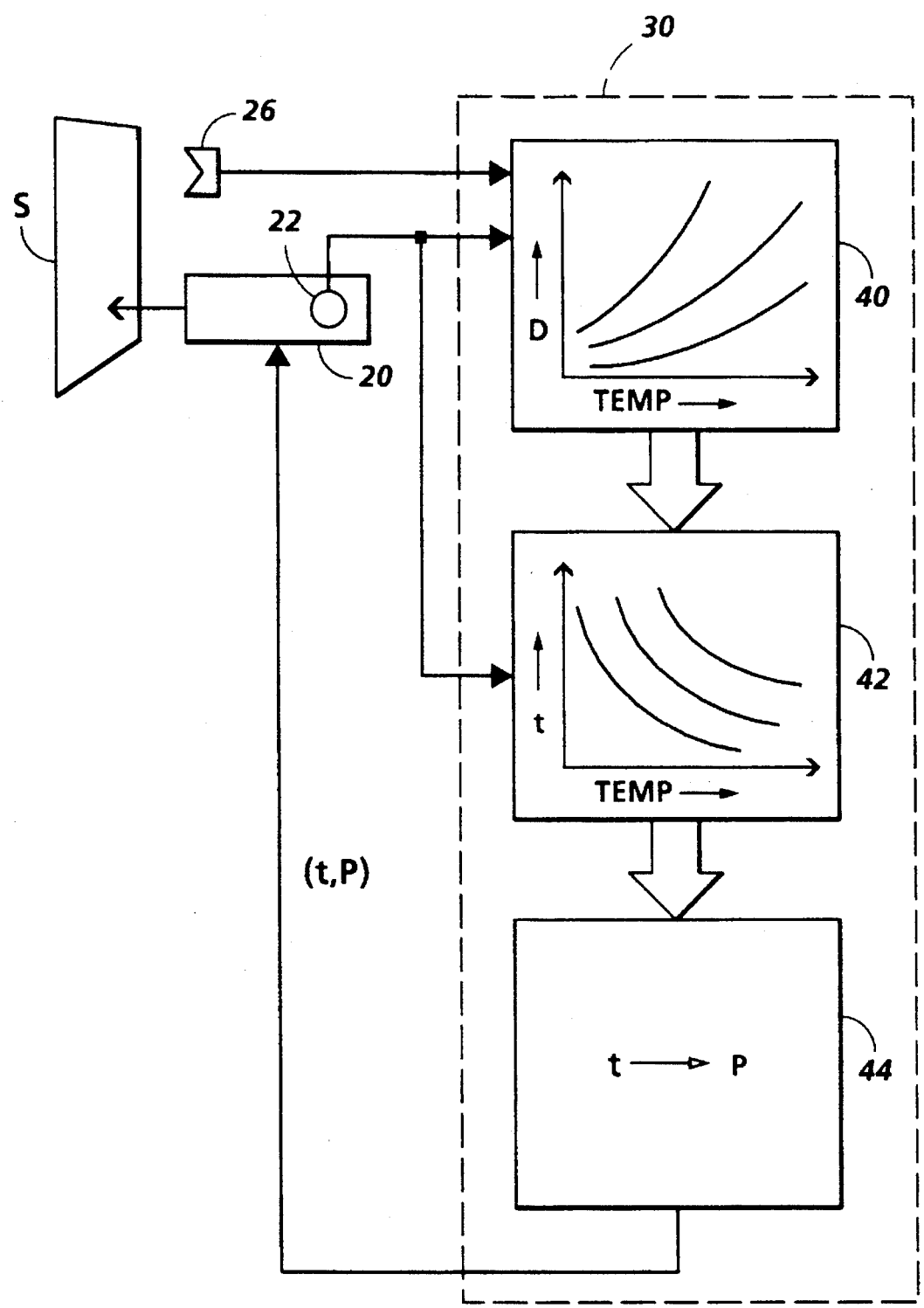
FIG. 5 is a diagram summarizing the calculations carried out according to the present invention.

FIG. 5 is a symbolic view showing the series of calculations carried out according to the method of the present invention in a self-calibrating system capable of producing spots of a consistent spot size under given initial conditions, and with a changing temperature of liquid ink in the course of the printing process. During the testing process, as described in relation to FIG. 2 above, the printhead 20 is caused by controller 30 to produce a set of heating areas, in order to deliberately change the temperature of the printhead, followed by a series of test patches intended to be of the same halftone density, the actual densities of which are measured by densitometer 26. As each test patch is printed by printhead 20, the thermistor 22 associated with the printhead 20 takes a temperature reading. There is thus obtained a plurality of relationships between the temperature of the printhead and the measured density of the test patch. These test points are then checked for a best fit from a set of predetermined relationships between printhead temperature and test patch density, which may be maintained in a memory associated with the printer. The look-up tables or other means which retain and carry out these functions within controller 30 are indicated in the system box marked 40. Each possible temperature response thus implies another relationship between liquid ink temperature and necessary pulse duration to obtain a constant spot size, as shown in FIG. 4, and also shown in smaller form in FIG. 5. The function, which may be embodied in software and/or hardware within controller 30, for converting a measured temperature into a suitable pulse duration t based on a selected relationship is indicated by the system box marked 42. There is thus obtained, based on the calibration, a best-fit relationship between measured liquid ink temperature and necessary pulse duration.

When the system is in the course of actually printing a desired image on a print sheet, thermistor 22 maintains a close monitoring of the temperature of the printhead (which will change substantially in the course of printing a job) and the temperatures are continuously fed into the selected function (which may be in the form of a look-up table stored in memory) to obtain the necessary pulse duration. This pulse duration is then fed into a function 44, which may include a look-up table and accompanying functions, as shown in FIG. 5, to obtain a power level consistent with the selected pulse duration, in a manner which is generally described in U.S. Pat. No. 5,223,853, particularly in the text therein relating to FIGS. 2B and 2C thereof. There is thus fed into printhead 20 a pulse duration and a power consistent therewith, to obtain a constant spot size, and thereby maintain a suitable print quality regardless of the liquid ink temperature at any given moment, and regardless of the initial conditions such as the character of the print sheet.

In brief, the present invention provides a self-calibrating system in which a test sheet is first printed, and from this print sheet and the densitometer readings thereof, is obtained a best function relating the temperature of the liquid ink to the halftone density. This relationship has implied therein all of the other variables going into print quality, which are all taken into account at once, whether they are explicitly known or not. The series of heating areas and test patches may be placed on a cover sheet with each job, such as unobtrusively on a job ticket.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method Of controlling a thermal ink-jet printhead adapted to emit ink in imagewise fashion onto a sheet, comprising the steps of:

causing the printhead to emit onto the sheet in order to produce an image having a first density, thereby bringing the printhead to a first temperature, and then substantially immediately afterwards causing the printhead to emit ink in a form of a first test pattern on the sheet, the first test pattern having a predetermined intended density;

measuring an actual density of the first test pattern on the sheet;

causing the printhead to emit onto the sheet in order to produce an image having a second density, thereby bringing the printhead to a second temperature, and then substantially immediately afterwards causing the printhead to emit ink in a form of a second test pattern on the sheet, the second test pattern having a same predetermined intended density as the first test pattern;

measuring an actual density of the second test pattern on the sheet; and deriving from the actual densities of the first test pattern and the actual density of the second test pattern a temperature response function, said temperature response function relating a characteristic of an image printed with the printhead to a temperature of the printhead.

2. The method of claim 1, wherein the step of causing the printhead to emit ink onto the sheet in a manner consistent with an image of a first density includes creating an image of substantially maximum ink coverage on the sheet.

3. The method of claim 1, further comprising the step of measuring a temperature of the printhead substantially simultaneously with the step of causing the printhead to emit ink in the form of a first test pattern and a second test pattern.

4. The method of claim 3, wherein the deriving step comprises the step of selecting a best temperature response function from a predetermined set of possible temperature response functions.

5. The method of claim 1, further comprising the steps of:

measuring a temperature of the printhead;

applying the measured temperature of the printhead to the temperature response function; and varying a performance variable of the printhead according to the temperature response function to obtain a desired characteristic of an image printed with the printhead.

6. The method of claim 5, wherein the varying step includes varying a performance variable of the printhead to obtain a desired spot size created on the sheet by one droplet of ink emitted by the printhead.

7. The method of claim 5, wherein the applying step includes applying the measured temperature of the printhead to a function temperature response relating power applied to a heater for vaporizing ink in the printhead to the temperature of the printhead.

8. The method of claim 5, wherein the applying step includes applying the measured temperature of the printhead to a function temperature response relating duration of an electrical pulse applied to a resistance in the printhead for vaporizing ink in the printhead to the temperature of the printhead.

* * * * *